Aug. 25, 1959    H. E. SULGER    2,901,645
INDUCTION MOTORS
Filed Sept. 18, 1956    2 Sheets-Sheet 1

INVENTOR
HAROLD E. SULGER
BY B. P. Fishburne, Jr.
ATTORNEY

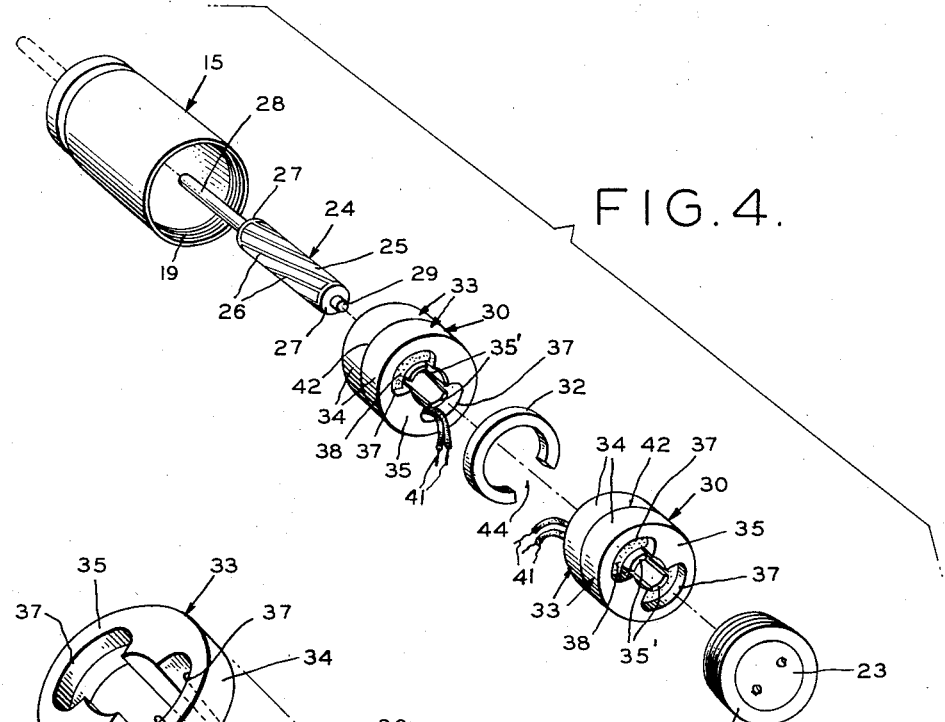

United States Patent Office 2,901,645
Patented Aug. 25, 1959

2,901,645

INDUCTION MOTORS

Harold E. Sulger, Westbury, N.Y., assignor to Porto Holding Corporation, Freeport, N.Y., a corporation of New York Application September 18, 1956, Serial No. 610,562

4 Claims. (Cl. 310—166)

This invention relates to induction motors.

A primary object of the invention is to provide a novel and improved construction for induction motors of the single or polyphase type, which construction is highly simplified and economical to manufacture, compact, and especially suited to the manufacture of miniature motors.

A further object is to provide a novel and simplified magnetic circuit for a squirrel cage inductor motor.

A further object is to provide a polyphase induction motor including a plurality of separate field coils, or windings, which are annular, and therefore very easy to wind, even with extremely fine wire.

Another object is to provide an induction motor wherein each annular stator winding is housed in a novel manner within a pair of companion magnetic field pieces, which field pieces together with the associated annular windings constitute the individual phase units of the motor.

Another object is to provide a novel polyphase induction motor comprising a long squirrel cage rotor and a plurality of stator or phase units arranged in end-to-end axially spaced relation along the rotor, and with the single rotor being common to all of the stator units, whereby the currents induced in the rotor by the individual phase units are additive, and the torques produced upon the rotor by the phase units are additive.

A still further object is to provide a motor which possesses the important advantages of conventional squirrel cage induction motors, but which is much more easily manufactured in miniature sizes.

Other objects and advantages of the invention will be apparent during the course of the following description.

Figure 1:
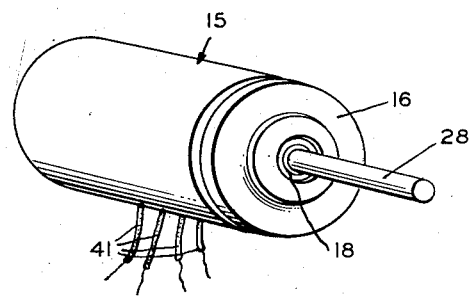
Figure 2:
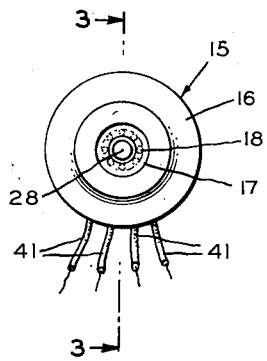
Figure 3:
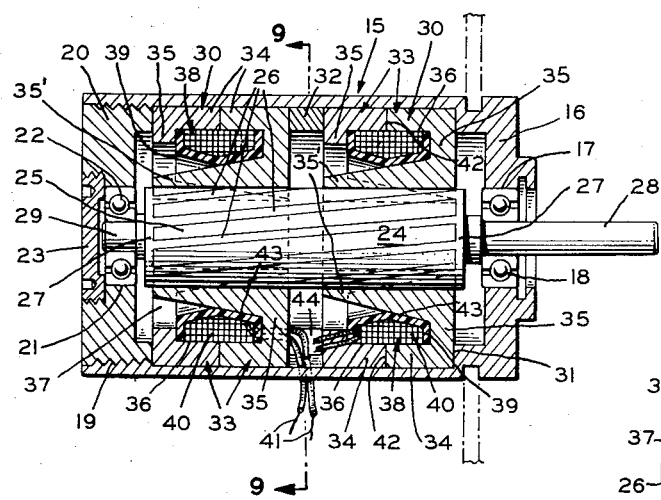
Figure 9:
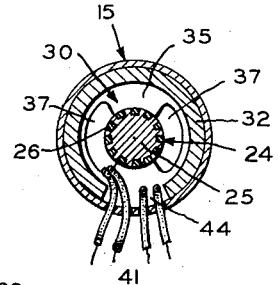
Figure 7:
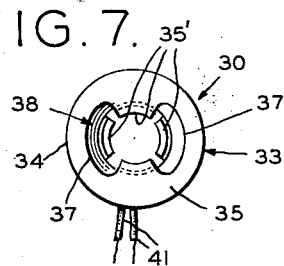
Figure 8:
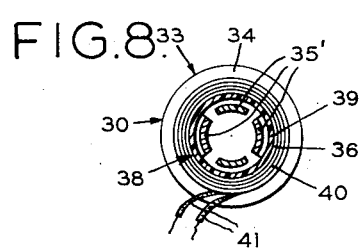

In the accompanying drawings, forming a part of this application, and in which like numerals are employed to designate like parts throughout the same, Figure 1 is a perspective view of a motor embodying the invention, Figure 2 is an end elevation of the motor, Figure 3 is an enlarged central vertical longitudinal section taken on line 3—3 of Figure 2, Figure 4 is an exploded perspective view of the motor, Figure 5 is an enlarged exploded perspective view of one phase or stator unit, Figure 6 is a perspective view partly in section of one magnetic field piece, Figure 7 is an end elevation of one phase unit, Figure 8 is a transverse vertical section through the phase unit of Figure 7, at the longitudinal center thereof, Figure 9 is a transverse vertical section taken on line 9—9 of Figure 3, Figure 10 is a perspective view of a magnetic field piece embodying a modification of the invention, Figure 11 is a perspective view in vertical section of a slightly modified form of motor wherein one phase or stator unit is adjustable circumferentially within the motor casing.

In the drawings, wherein for the purpose of illustration are shown preferred embodiments of the invention, attention is directed first to Figures 1 through 9, wherein the numeral 15 designates a cylindrical motor casing having one end open, as shown. The casing 15 has an end wall 16 integral therewith, and having a bore 17 formed centrally therethrough for the reception of a rotor bearing 18. At its open end, the casing 15 is internally screw-threaded at 19 for the reception of a removable screw-threaded plug 20, having a central axial bore 21 formed therein and receiving the second rotor bearing 22. A smaller removable screw-threaded plug 23 may be provided in the plug 20 at the outer side of the bearing 22 to facilitate servicing the latter.

A substantially conventional squirrel cage rotor 24 is provided, and the rotor has a cylindrical elongated body portion 25 of iron or like magnetic material, with a plurality of circumferentially spaced generally axial copper conducting bars 26 embedded therein adjacent the surface of the body portion 25. The body portion 25 may be formed with grooves to receive the bars 26. The usual conducting end discs 27 of copper or the like are rigidly secured to the opposite ends of the body portion 25, and are in electrical contact with the bars 26 for short circuiting the latter in a well known manner. The rotor 24 has reduced axially aligned end shaft extensions 28 and 29, journaled respectively within the bearings 18 and 22. The shaft extension 28 extends beyond one end of the motor casing and serves as the power take-off shaft of the motor.

The motor of the present invention may be either a single or polyphase motor, and for the purpose of illustration has been shown as a two phase induction motor. In the present embodiment, the separate phase units 30 are identical in construction, and it will be understood that the motor may be constructed with any desired number of the separate phase or stator units 30, found to be practical or desirable. The squirrel cage rotor 24 is a unitary rotor, common to all of the units 30, regardless of the number of units, and the length of the rotor 24 will be determined by the number of phase units 30 employed.

As shown in Figure 3, one of the phase units 30 has an end engaging an annular shoulder 31 of the casing 15 near and inwardly of the end wall 16. The second phase unit 30 engages a split spacer ring 32 within the casing 15 near its longitudinal center. The ring 32 serves to maintain the separate units 30 in the desired axially spaced relation within the motor casing. The screw-threaded plug 20 engages the outer end of the second phase unit 30 and clamps the several elements together within the casing 15, in the manner shown. The arrangement is such that the phase units 30 which constitute the stator are securely held between the plug 20 and shoulder 31 so that they will not rotate or move axially. The rotor 24 is, of course, freely rotatable relative to the units 30 and casing 15.

Each phase or stator unit 30 comprises a pair of identical magnetic field pieces 33, including peripheral annular ring portions 34 and outer end walls 35. The inner end of each magnetic field piece 33 is open. Each field piece 33 further embodies a single pair of diametrically oppositely arranged substantially axial fingers or projections 35', formed integral with the end wall 35 and spaced radially inwardly of the ring portion 34. Each finger 35' is circularly curved transversely for rendering the inner surface of the finger concentric with the rotor 24. Each finger 35' tapers toward its free end, and extends from the end wall 35 through the ring portion 34 to a point of termination a substantial distance forwardly of the ring portion. The fingers 35' form with the end wall 35 and ring portion 34 an annular groove or recess 36 for a purpose to be described. The end wall 35 of each field piece 33 has a pair of diametrically opposed arcuate openings 37, each spaced ninety degrees circumferentially from the fingers 35'.

Each phase unit further comprises a field or stator coil or winding 38. The winding 38 consists of an annular spool 39 of electrical insulating material, having a continuous circumferentially wound fine copper wire coil 40 thereon, as shown. Insulated end portions or leads 41 of the annular coil 40 extend freely from the inner periphery of the spool 39. The outer peripheral surface of the wire coil 40 may be coated with suitable insulating material in a conventional manner.

In assembly, the magnetic field pieces 33 which are formed of magnetic material such as iron are arranged in end-to-end abutting relation with the end walls 35 arranged outermost and the open ends of the fields pieces arranged innermost. The fingers 35' of the pair of field pieces now interfit circumferentially, and the openings 37 of each field piece receive the extremities of the fingers 35' of the companion field piece. The four assembled fingers 35' are spaced apart ninety degrees circumferentially, Figures 7 and 8.

The open ends of the field pieces 33 directly abut or contact as indicated at 42, Figure 4, and the stator coil 38 is disposed bodily within the annular passages 36 which now constitute a unitary annular chamber for the coil 38 as clearly shown in Figure 3. The annular coil 38 has its opposite ends engaging the end walls 35 and the outer periphery of the coil engages the inner faces of the ring portions 34. The bore 43 of the coil 38 is preferably flared from the center of the coil toward its ends, to conform to the taper of the fingers 35', Figure 3. The interfitting fingers 35' of the assembled unit 30 project in opposite directions through and somewhat beyond the ends of the coil 38. The extremities of the fingers are preferably flush with the ends of the unit 30, Figure 3, although this arrangement may be varied somewhat. The cylindrical bore defined by the inner surfaces of the fingers 35' is of a proper size to receive the rotor 24 and to allow a proper running fit for the latter, in accordance with good magnetic circuit design. The body portion 25 of the rotor is sufficiently long to span completely the bores of both assembled phase units 30, as shown, and as previously mentioned, when additional phase units are employed in the polyphase motor, the rotor 24 is correspondingly longer and common to all phase units.

The coil ends or leads 41 of each unit 30 extend through the gap 44 of spacer ring 32 and then through small openings formed radially through the casing 15 adjacent the longitudinal center thereof. The leads 41 of each coil 38 are electrically connected outside of the casing 15 with the phase wires of a two phase alternating current system. The coils 38 are not electrically connected with each other in series or otherwise.

*Operation*

In operation, current is supplied to each phase unit 30 through the lead wires 41 of the separate coils 38. As in every squirrel cage induction motor, the current flowing in one coil 38 will cause a flux field to be established in the pole pieces 33 of the particular unit 30, and this magnetic flux will interact with the squirrel cage rotor to induce current in the bars 26 of the rotor, such current interacting with the flux field of the other unit 30 to produce torque upon the rotor 24. In the present construction, the currents induced in the rotor by the separate phase units 30 and the corresponding torques produced upon the rotor are additive.

In each phase unit 30 the fingers 35' of each magnetic field piece 33 are of like polarity, such as two north poles, and the fingers 35' of the other magnetic field piece are of like polarity or two south poles. Consequently, in the assembly as viewed, for example, in Figure 7, the fingers 35' are alternately north and south poles circumferentially of the unit 30, and the fingers of the pair of field pieces 33 interfit circumferentially as previously described. When current is applied to the annular coil 38 surrounding the interfitting fingers 35', the flux circuit will be circumferentially of one ring portion 34 and then radially through one finger 35' of the same field piece 33 and then through the rotor 24 circumferentially to the next finger 35' of opposite polarity, which finger will be on the opposite field piece 33 of the particular phase unit 30. The flux circuit then continues circumferentially of the ring portion 34 of the last-mentioned field piece 33 to the next finger 35' of opposite polarity which will be again on the opposite field piece 33. The flux circuit continues through this last-mentioned finger 35' to the rotor 24 and through the rotor to the next finger 35' of opposite polarity which will again be on the opposite field piece 33 of the unit 30. From the last-mentioned finger 35', the flux circuit continues circumferentially of the ring portion 34 of the last-mentioned field piece to the next finger 35' of opposite polarity and through such finger and through the rotor 24 to the next finger 35' of opposite polarity, and so on until all four interfitting fingers 35' of the two magnetic field pieces 33 of the particular unit 30 are in the magnetic circuit for causing current to be induced in the bars 26 of the squirrel cage rotor. The magnetic circuits of the separate phase units 30 are identical and their current-inducing actions and torque producing effects are identical and additive.

In Figure 10, there is shown a modified type of magnetic field piece 33', identical with the field piece 33 except that its fingers or projections 35a are of laminated construction lengthwise, as shown, in order to reduce eddy currents in the magnetic circuit of the motor. All other parts and their functions are identical with the corresponding parts shown and described in connection with the prior form of the invention.

In Figure 11, means are shown for adjusting one phase unit 30 circumferentially of the motor casing 15' while the other unit 30 remains stationary. With this arrangement, the direction of rotation of the rotor 24 may be reversed and its speed of rotation changed or varied.

In Figure 11, the casing 15' has a circumferential slot 45 formed through its side wall and extending for approximately forty-five degrees upon opposite sides of a median or neutral point. A radial screw 46 projects through the slot 45 and is movable therein and the inner end of the screw is received within a screw-threaded opening 47, formed partly within the two ring portions 34 of the magnetic field pieces 33 of the particular unit 30 to be rendered adjustable. In order to adjust the unit 30 circumferentially, the plug 20 is first loosened and the screw 46 is loosened and the desired circumferential adjustment of the unit 30 within the casing in either direction from the longitudinal center of the slot 45, or neutral point, can readily be made. After this adjustment, the screw 46 is again tightened, as is the threaded plug 20. The speed of rotation of the motor may thus be varied by shifting the screw 46 toward either end of the slot 45, and the speed will be zero when the screw 46 is at the longitudinal center of the slot. The direction of rotation of the motor is changed or reversed at the central or neutral point of the slot 45, and the speed of rotation increases toward the opposite ends of the slot for both directions of rotation.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. A polyphase induction motor comprising a plurality of separate axially spaced substantially annular single phase stator windings, each said single phase stator winding being free from electrical connection with the next adjacent stator winding, a companion pair of generally annular magnetic field pieces substantially enclosing each single phase stator winding, each pair of magnetic field pieces including generally axial circumferentially spaced interfitting pole pieces arranged to define an axial bore for a rotor, and a unitary elongated squirrel cage rotor extending rotatably through said rotor bore and common to said plurality of separate single phase stator windings and substantially coextensive with said plurality of the stator windings, said separate single phase stator windings interacting with said rotor to produce torque thereon as a result of an effective rotating field due to the separate actions of the individual single phase stator windings.

2. A polyphase induction motor comprising a motor casing, at least a pair of separate axially spaced single phase stator coils free from electrical connection with each other disposed within said casing, a companion pair of magnetic field pieces receiving each separate single phase stator coil within said casing, each pair of field pieces having generally axially extending circumferentially spaced interfitting pole pieces extending through the bore of each stator coil, the pole pieces of all pairs of magentic field pieces collectively defining an axial rotor bore, and a single elongated squirrel cage rotor journaled upon said casing and rotatable within said rotor bore and being common to all of said separate unconnected single phase stator coils and adapted to have torque produced thereon by the collective actions of the separate single phase stator coils.

3. A polyphase induction motor comprising a motor casing, a squirrel cage rotor journaled upon said casing, and a plurality of separate axially spaced phase units associated with and surrounding said squirrel cage rotor within said casing, each of said phase units having a separate and independent electrical circuit free from connection with the next adjacent phase unit, said single squirrel cage rotor being common to and substantially coextensive with said plurality of phase units, each phase unit comprising an annular single phase winding and a companion pair of generally annular magnetic field pieces having annular groove means receiving and substantially enclosing the single phase winding, each pair of field pieces having substantially axial circumferentially spaced interfitting pole pieces surrounding said rotor in close proximity thereto, the collective action of all of said phase units creating an effective rotating field and producing torque upon said squirrel cage rotor when energized.

4. A polyphase induction motor comprising a motor casing, a pair of separate axially spaced annular phase units mounted within the casing, each phase unit having a single phase annular wire coil, a companion pair only of magnetic field pieces for the single phase coil of each phase unit including annular parts substantially enclosing the coil, each pair of field pieces having generally axial circumferentially interfitting pole forming parts arranged to provide a substantially continuous bore axially of the field pieces and single phase coil of each phase unit, and an elongated squirrel cage rotor journaled upon said casing and extending axially of the bores of the pair of phase units and being common to the pair of phase units so that the single phase coils of the pair of phase units when energized may interact to create an effective rotating field and produce torque upon the squirrel cage rotor.

References Cited in the file of this patent

UNITED STATES PATENTS

| | | |
|---|---|---|
| 1,959,391 | Spencer | May 22, 1934 |
| 2,443,104 | Glass | June 8, 1948 |
| 2,524,361 | Sawyer et al. | Oct. 3, 1950 |
| 2,671,179 | Blanchard | Mar. 2, 1954 |

FOREIGN PATENTS

| | | |
|---|---|---|
| 136,970 | Australia | Apr. 17, 1950 |
| 979,689 | France | Dec. 13, 1950 |